(12) United States Patent
van Rensburg et al.

(10) Patent No.: US 9,628,621 B2
(45) Date of Patent: *Apr. 18, 2017

(54) SYSTEM AND METHOD FOR PROVIDING ACCESS TO A VISUAL PHONE MENU

(71) Applicant: RingCentral, Inc., San Mateo, CA (US)

(72) Inventors: Christopher van Rensburg, Foster City, CA (US); Dieter W. Rencken, Half Moon Bay, CA (US); Naveen Sanjeeva, Saratoga, CA (US)

(73) Assignee: RingCentral, Inc., Belmont, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/614,128

(22) Filed: Feb. 4, 2015

(65) Prior Publication Data

US 2015/0281442 A1    Oct. 1, 2015

Related U.S. Application Data

(63) Continuation of application No. 14/231,638, filed on Mar. 31, 2014, now Pat. No. 8,995,627.

(51) Int. Cl.
*H04M 11/00* (2006.01)
*H04M 3/493* (2006.01)
*H04M 3/48* (2006.01)

(52) U.S. Cl.
CPC ........... *H04M 3/4936* (2013.01); *H04M 3/48* (2013.01); *H04M 3/493* (2013.01)

(58) Field of Classification Search
CPC ..... H04M 3/48; H04M 3/34936; H04M 3/493
See application file for complete search history.

(56) References Cited

U.S. PATENT DOCUMENTS

| 5,802,526 | A | * | 9/1998 | Fawcett | G06F 3/167 |
| | | | | | 348/14.06 |
| 5,937,040 | A | * | 8/1999 | Wrede | H04M 1/247 |
| | | | | | 370/524 |
| 6,104,790 | A | | 8/2000 | Narayanaswami | |
| 7,054,939 | B2 | | 5/2006 | Koch et al. | |

(Continued)

OTHER PUBLICATIONS

"Using Fonolo," [online] © 2010; Retrieved from the Internet URL: http://fonolo.com/consumer, 1 page.

(Continued)

*Primary Examiner* — Simon Sing
(74) *Attorney, Agent, or Firm* — Fish & Richardson P.C.

(57) ABSTRACT

Methods, systems, and apparatus, including computer programs encoded on a computer storage medium, for providing access to a visual phone menu is disclosed. One of the methods includes receiving a call request transmitted from a calling device to initiate a call to a recipient; saving state information associated with the caller's navigation through a voice response system; providing an option for the caller to select between receiving a visual phone menu (VPM) or continuing to listen to the voice response system menu; receiving a selection of the option to receive the VPM; providing the VPM to a client device including providing state information associated with the caller's navigation through the voice response system prior to the selection; and using the state information when the caller navigates back in the response tree using the VPM.

19 Claims, 8 Drawing Sheets

(56) References Cited

U.S. PATENT DOCUMENTS

| | | | |
|---|---|---|---|
| 7,095,840 B2 | 8/2006 | Dezonno et al. | |
| 8,000,454 B1 | 8/2011 | Or-Bach et al. | |
| 8,081,749 B1 | 12/2011 | Shaffer et al. | |
| 8,155,276 B2 | 4/2012 | Beauregard et al. | |
| 8,203,594 B2 | 6/2012 | Jaspersohn et al. | |
| 8,223,929 B2 | 7/2012 | Sylvain | |
| 8,374,317 B2 | 2/2013 | Jaiswal et al. | |
| 8,553,859 B1* | 10/2013 | Lavian | H04M 3/493 379/88.18 |
| 8,638,913 B2 | 1/2014 | Larson | |
| 2004/0120479 A1 | 6/2004 | Creamer et al. | |
| 2004/0121814 A1 | 6/2004 | Creamer et al. | |
| 2005/0286707 A1* | 12/2005 | Erhart | H04M 3/2281 379/265.07 |
| 2006/0099931 A1 | 5/2006 | Trujillo | |
| 2007/0173237 A1 | 7/2007 | Roundtree | |
| 2007/0280460 A1 | 12/2007 | Harris et al. | |
| 2008/0109226 A1 | 5/2008 | Gao et al. | |
| 2009/0154666 A1 | 6/2009 | Rios et al. | |
| 2009/0154678 A1 | 6/2009 | Kewin et al. | |
| 2009/0202050 A1 | 8/2009 | Berger et al. | |
| 2010/0217816 A1* | 8/2010 | Smelyansky | H04L 12/5835 709/206 |
| 2011/0293083 A1 | 12/2011 | Larson | |
| 2012/0008755 A1* | 1/2012 | Mittal | H04M 3/4931 379/93.01 |
| 2012/0140904 A1* | 6/2012 | Li | H04M 3/493 379/88.01 |
| 2015/0237196 A1* | 8/2015 | Song | G06Q 30/00 455/414.1 |

OTHER PUBLICATIONS

"What's Fonolo?," [online] © 2010; Retrieved from the Internet URL: http://business.fonolo.com/, 4 pages.

"Automated Phone Trees: Two Potential Solutions," [online] Jul. 5, 2009; Retrieved from the Internet URL: http://developmentality.wordpress.com/2009/07/05/automated-phone-trees-two-potential-solutions/, 3 pages.

* cited by examiner

SYSTEM AND METHOD FOR PROVIDING ACCESS TO A VISUAL PHONE MENU

CROSS-REFERENCE TO RELATED APPLICATION

This application is a continuation of U.S. application Ser. No. 14/231,638, filed Mar. 31, 2014, the disclosure of which is hereby incorporated by reference in its entirety.

BACKGROUND

This disclosure generally relates to providing access to visual phone menus (VPMs) to callers.

Telephone (phone) menus can be used in a company's telephone system to route callers to a desired department, person, or extension within the company during a call. As an example, a customer calling into a company telephone system may wish to reach a specific department, e.g., sales, technical support, or customer service, or a person at an extension. During the call set-up, a conventional phone menu can be played to the customer and can include an audio message containing instructions such as "Select or say '1' for sales; select or say '2' for technical support; select or say '3' for customer service", etc. When the customer selects a number on a phone keypad or verbalizes the number corresponding to the desired destination, the customer's call is transferred to the selected extension. Phone menus are sometimes referred to as interactive voice response (IVR), auto-attendants, or phone response trees.

Some companies offer visual phone menus that can be viewed by their customers in an internet browser. Generally, the visual phone menu provides a short description of available departments in the company and an associated hyperlink for each department. The customer views the available departments in the browser and selects a desired department that the customer wishes to call. In response to the selection, a call is initiated between the department and the customer. The customer may also enter a contact number for callback, e.g., so that the customer is called back at the provided contact number and thereby connected to the selected department.

SUMMARY

In general, one innovative aspect of the subject matter described in this disclosure can be embodied in methods that include the actions of receiving a call request transmitted from a calling device to initiate a call to a recipient, the recipient being associated with a voice response system that includes a response tree that can be navigated by a caller listening and responding to various voice prompts; saving state information associated with the caller's navigation through the voice response system; providing an option for the caller to select between receiving a visual phone menu (VPM) or continuing to listen to the voice response system menu; receiving a selection of the option to receive the VPM; providing the VPM to a client device including providing state information associated with the caller's navigation through the voice response system prior to the selection; and using the state information when the caller navigates back in the response tree using the VPM. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. In some aspects, providing an option includes providing the user a voice prompt of the availability of the VPM. In some aspects, providing an option includes storing a preference associated with a caller that initiated the call and, based on the stored preference, selecting between the VPM and the voice response system. In some aspects, providing an option includes determining a selection based on a depth or complexity of the response tree and capabilities of the client device. Some aspects further include providing both the VPM and voice prompts. In some aspects, the client device is the same as the calling device.

Some aspects further include saving state information associated with a user's navigation through the VPM; providing an option for a caller to select to return to listen prompts to the voice response system menu; receiving a selection of the option to return to the voice response system; and providing the state information associated with the user's navigation through the VPM to the voice response system so as to enable navigation there afterwards in the response tree. Some aspects further include receiving selections from the client device of menu items in the VPM and traversing the response tree based on the received selections. In some aspects, the call is intended for a primary phone number associated with an account of the recipient on a hosted PBX. In some aspects, providing the VPM to the client device comprises providing the VPM using a VPM address, wherein the VPM address is a uniform resource locator (URL) or an internet protocol (IP) address that belongs to a VPM server. Some aspects further include: sending the calling device a short message service (SMS) message with instructions for accessing the VPM.

In some aspects, the VPM is provided in a markup language adapted for desktop voice over internet protocol (VoIP) phones. In some aspects, determining whether a visual phone menu is available comprises: looking up a phone number for the recipient in a VPM directory that stores a plurality of phone numbers and any associated VPM addresses. Some aspects further include determining that a VPM is not available for the recipient; obtaining data defining the voice response system for the recipient, wherein the data defining the voice response system includes data defining a structure of the response tree; and generating, from the data defining the voice response system, a VPM for the recipient.

In general, another innovative aspect of the subject matter described in this disclosure can be embodied in methods that include the actions of receiving a call request transmitted from a calling device to initiate a call to a recipient, the recipient being associated with a voice response system that includes a response tree that can be navigated by a caller listening and responding to various voice prompts; providing an option for the caller to select between receiving a visual phone menu (VPM) or continuing to listen to the voice response system menu; receiving a selection of the option to receive the VPM; providing the VPM to a client device associated with the caller when the caller selects receiving the VPM; and receiving selections presented in the VPM from the client device for navigating the response tree including enabling the caller to return to the voice response system. Other embodiments of this aspect include corresponding computer systems, apparatus, and computer programs recorded on one or more computer storage devices, each configured to perform the actions of the methods.

In general, another innovative aspect of the subject matter described in this disclosure can be embodied in methods that include the actions of receiving a call request transmitted from a calling device to initiate a call to a recipient, the recipient being associated with a voice response system that includes a response tree that can be navigated by a user listening and responding to various voice prompts; determining a visual phone menu (VPM) is available for the recipient; determining that a caller associated with the call has access to a client device while conducting the call, the client device configured for receiving and presenting visual information to the user; determining to either automatically present the VPM on the client device or present an option for presentation of the VPM on the client device based on one or more signals; providing the VPM to the client device; and receiving selections presented in the VPM from the client device for navigating the response tree. Other embodiments of this aspect include corresponding computer systems, apparatus, and computer programs recorded on one or more computer storage devices, each configured to perform the actions of the methods.

These and other embodiments can optionally include one or more of the following features. In some aspects, the signals include one or more of a complexity of the response tree, a number of available options at a given node of the response tree, a preference of the caller, reaching an end of a set of options for a given node in the response tree, a geographical location of caller, device language capabilities, and/or account type.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

This specification generally describes techniques for allowing a caller to navigate a response tree using a visual phone menu (VPM), by responding to voice prompts generated by a voice response system (VRS), or both. A response tree is a sequence of menus that can be navigated by a caller during a call in order to speak to a person at a particular extension or to accomplish a particular task, e.g., to pay a bill, to check an account balance, to learn about the operating hours of a business, and so on. That is, a user can navigate from a first node to a second node in the response tree by making a selection from a menu associated with the first node. During the call, a caller is able to navigate forward in the sequence and backward in the sequence, e.g., if the caller determines that the selection made in a previous menu was incorrect, the caller can optionally return to the previous menu(s) in the sequence.

Particular embodiments of the subject matter described in this disclosure can be implemented so as to realize one or more of the following advantages. Callers can be allowed to easily navigate a response tree using either a VPM or a VRS menu or by switching back and forth between the VPM and the VRS. In some example embodiments, the caller experience can be optimized by automatically selecting whether to allow the caller to navigate the response tree using the VPM or by responding to voice prompts. State information relating to user navigation of the response tree using the VPM can be saved to allow the user to seamlessly switch to responding to voice prompts to continue navigating the tree, thereby improving the user experience. Similarly, state information relating to user navigation of the response tree by responding to voice prompts can be saved to allow the user to seamlessly switch to using a VPM to continue navigating the tree. By saving caller state information, providers of VPMs can gain a better understanding of and have a richer context around how the caller has navigated to a current point in a response tree and what other solutions the caller may have attempted to solve their problem. By allowing callers to more easily navigate a response tree, the number of calls from callers that must be fielded by call center personnel can be reduced. Additionally, by using a VPM, users can more easily input data from mobile devices that would otherwise be difficult to input. By allowing users the option to use VPMs to navigate a response tree, call time can be greatly reduced, thereby reducing load on the network and reducing costs. Furthermore, allowing users the option to use VPMs can replace audio data with more compact VPM data, reducing the load on the network and reducing costs.

System Overview

Figure 1A:
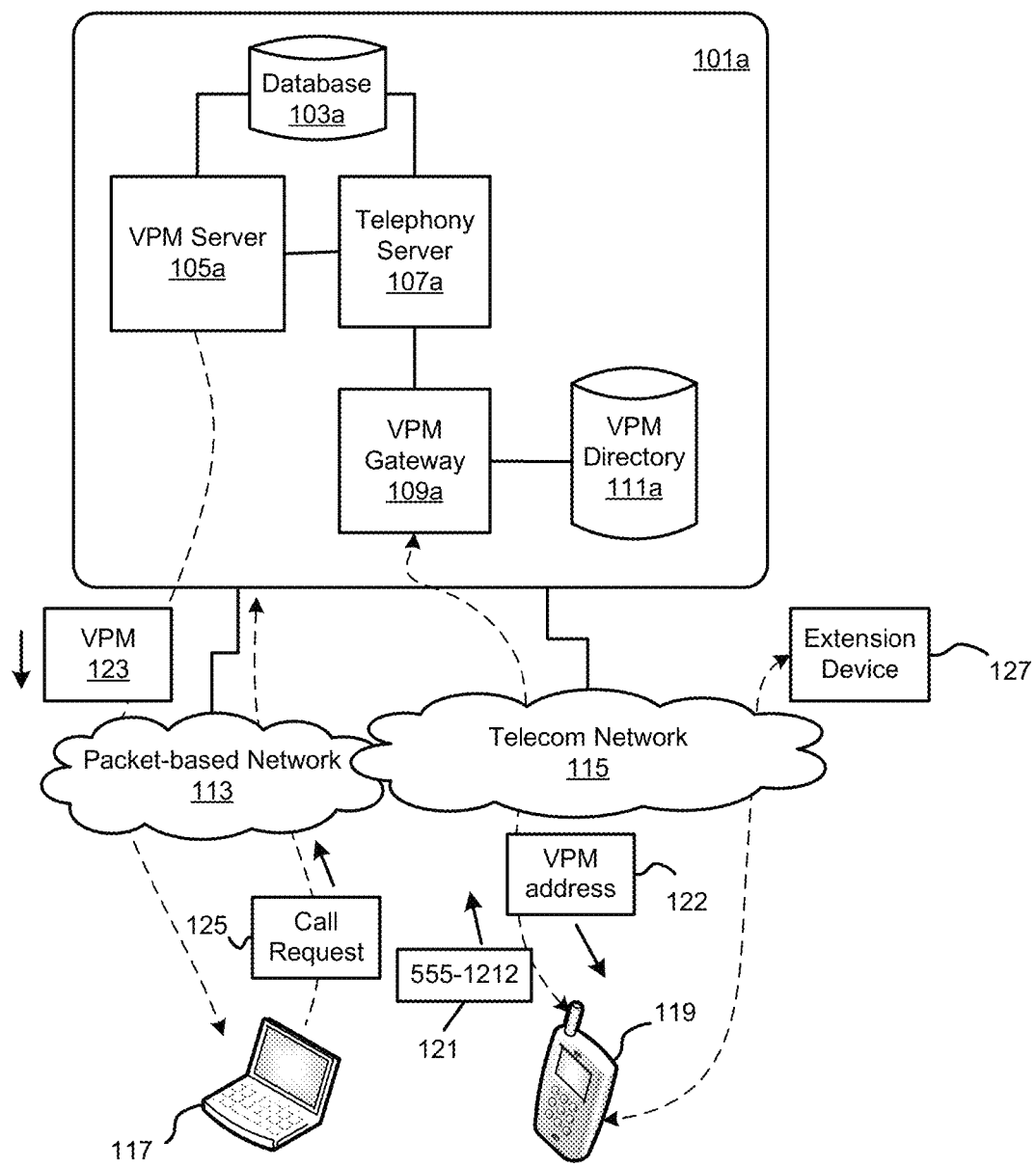
FIG. 1A shows an example of a system for accessing a visual phone menu.

FIG. 1A shows an example of a system for accessing a VPM. A hosted Private Branch Exchange (PBX) 101a is coupled to a packet-based network 113 and a telecommunications ("telecom") network 115. A hosted PBX (also known as a virtual PBX or a cloud-based PBX) provides PBX functionality and other telephony services to subscribers from remote servers. The hosted PBX services can be delivered over the packet-switched network 113, over the telecom network 115, or over a combination of the two.

The packet-based network 113 carries data in packetized form over a packet-switched network (e.g., the Internet) and can include local area networks (LAN), wide area networks (WAN), wireless LANs, WiMax networks, etc. The telecom network 115 carries voice communications and includes public switched telephone networks (PSTN), cellular networks, Voice over IP (VoIP) networks, etc. As indicated in FIG. 1A, there is some overlap between the telecom network 115 and the packet network 113 since VoIP communications are also packetized and carried over the Internet. The hosted PBX 101a communicates with and provides services to a client device 117 and a calling device 119. The client device 117 can be of the form of any internet-enabled computing device that has a display for displaying information received over the Internet. The calling device 119 can be of the form of a telephony device such as a cellphone, smartphone, softphone, landline phone, VoIP phone, etc.

The hosted PBX 101a includes a database 103a, a VPM server 105a, a telephony server 107a, a VPM gateway 109a, and a VPM directory 111a. It should be noted that while the components in the hosted PBX 101a are shown as separate modules in FIG. 1A, one or more of these components can be combined or co-located (e.g., into and located in the same physical server or rack).

In the presently described embodiment, the database 103a stores account configuration information, such as call answering rules, call routing rules, billing information, etc. The database 103a also stores extension information that is needed to create a VPM, such as the extension number (e.g., ext. 142) and a name for the extension (e.g., department or person's name). Typically, a subscriber to the hosted PBX 101a has at least one primary phone number associated with an account, and the primary phone number can be associated with one or more extensions that can be configured to point to any of the subscriber's devices. The subscriber's devices may have their own phone number ("secondary phone number") as well. In some implementations, the primary phone number is provided by the subscriber as a main contact number for the subscriber's company. An example extension device 127 associated with a primary phone number is shown in FIG. 1A. The example extension device 127 may have its own secondary phone number as well.

The VPM server 105 provides a VPM 123 to a client device 117. The content in the VPM (e.g., department name, etc.) can be based on or derived from the account configuration information stored in the database 103. The telephony server 107a provides telephony services such as answering inbound calls, making outbound calls, bridging calls, playback, call recording, and voicemail, among other things.

The calling device 119 initiates a call by calling a phone number 121 (e.g., "555-1212"). Alternatively, if the call is a VOIP call, rather than calling a phone number, the calling device initiates the call by sending a call request to the intended recipient over packet-based network 113. Additionally, as will be discussed in more detail below, in some embodiments, the calling device 119 is the same device as the client device 117. That is, in some embodiments, the call can be initiated by the client device 117. The VPM gateway 109a receives the called number from the calling device 119 over the telecom network 115, or, if the call is a VOIP call, a call request from the calling device 119 over the packet-based network 113. The VPM gateway 109a determines if a VPM is available for the called number. The VPM gateway 109a looks up the called phone number 121 in the VPM directory 111a. Alternatively, if the call is a VOIP call, the VPM gateway 109a can look up another identifier for the recipient of the call. The VPM directory 111a stores information including phone numbers, whether a VPM exists for that phone number, and the address of the VPM (e.g., a uniform resource locator, "URL"), if one exists.

Table 1 below is an example of the information that can be found in the VPM directory 111.

TABLE 1

| Number | VPM Available? | VPM address |
|---|---|---|
| 555-1212 | Yes | www.companyA.com/vpm/subscriber |
| 555-5678 | No | — |
| 555-2222 | Yes | www.companyB.com/vpm |
| 555-3434 | Yes | 199.239.136.200 |

The first column of Table 1 ("Number") contains the primary phone numbers associated with each account on the hosted PBX 101a. The second column ("VPM Available?") indicates whether the phone number has a VPM associated with it. A "yes" indicates that a VPM exists for that particular phone number; a "no" indicates that a VPM is not provided. The third column ("VPM address") contains the address for the VPM if one exists. In the presently described embodiment, the VPM address is a uniform resource locator (URL) or an internet protocol (IP) address for the VPM server 105a. The information in Table 1 can be compiled by the hosted PBX 101a, using information in its database 103 regarding its subscribers, the primary phone numbers associated with the subscriber accounts, and whether those subscribers have set up a VPM to provide to their callers. The VPM directory 111a can also be hosted by an organization separate from the hosted PBX 101a. For example, the VPM directory 111 can be a separate directory service operated by a third-party registrar company that collects, maintains, and updates the data regarding phone numbers and corresponding VPMs, similar to an online phone book or yellow pages directory.

In various example implementations, there are a number of ways in which a caller can interact with the VPM when it is presented on the client device 117. For example, the VPM can process user inputs such as touch, voice, keyboard, mouse click, stylus, and/or other input types.

In some implementations, the calling device 119 is the same device as the client device 117, e.g., if the calling device is a smartphone, a softphone, or similar computing or non-computing device with a processor having telephony capability and internet access. In these cases, the calling device 119 optionally includes VPM client software that facilitates the process of calling a number and accessing the number's VPM. For example, the calling device 119 can have VPM client software installed that allows the calling device 119 to initiate a call, access a VPM, navigate a response tree to select an extension from the VPM, and complete a call to the selected extension, all from the same calling device 119. Alternatively, rather than having specific VPM client software, the calling device 119 can present the VPM in a general purpose Internet browser or other application.

Figure 1B:
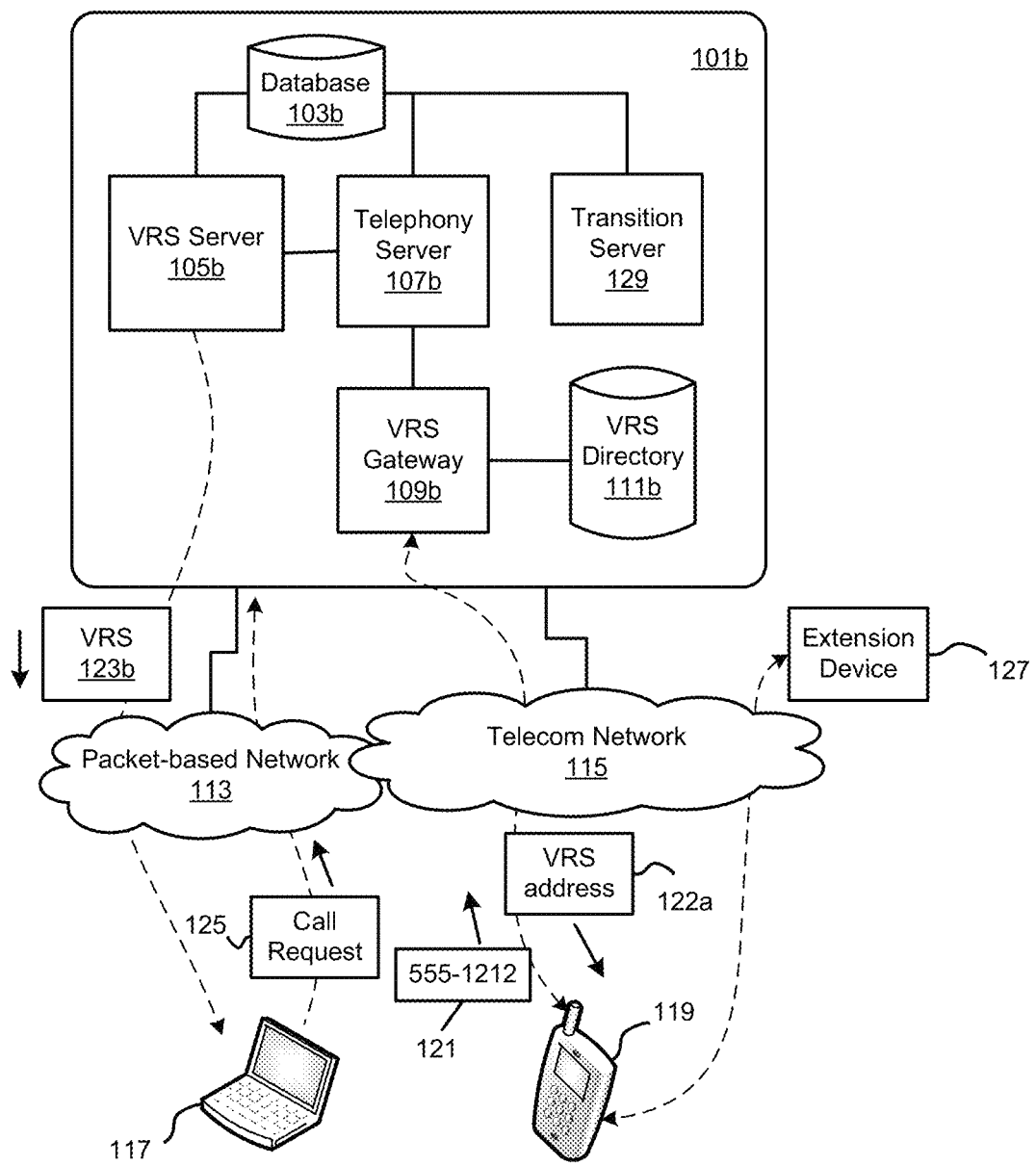
FIG. 1B shows an example of a system for accessing a voice response system.

FIG. 1B shows an example of a system for accessing a VRS. A hosted PBX 101b is coupled to the packet-based network 113 and the telecommunications ("telecom") network 115. The hosted PBX 101b communicates with and provides services to the client device 117 and the calling device 119. As shown in FIG. 1B, the system for accessing the VRS has a similar configuration as the system for accessing the VPM shown in FIG. 1A. Other configurations are possible, and some components of both systems can be shared.

The hosted PBX 101b includes a database 103b, a VRS server 105b, a telephony server 107b, a VRS gateway 109b, and a VRS directory 111b. It should be noted that while the components in the hosted PBX 101b are shown as separate modules in FIG. 1B, one or more of these components can be combined or co-located (e.g., into and located in the same physical server or rack).

In the presently described embodiment, the database 103b stores account configuration information, such as call answering rules, call routing rules, billing information, etc. The database 103b also stores extension information that is needed to create a VRS, such as the extension number (e.g., ext. 142) and a name for the extension (e.g., department or person's name). Typically, a subscriber to the hosted PBX 101a has at least one primary phone number associated with an account, and the primary phone number can be associated with one or more extensions that can be configured to point to any of the subscriber's devices. In some implementations, the primary phone number is provided by the subscriber as a main contact number for the subscriber's company. An example extension device 127 associated with a primary phone number is shown in FIG. 1B.

The VRS server 105b provides a voice response menu 123b to the client device 117. The voice response menu 123b allows the caller to navigate a response tree by responding to a series of voice prompts that each identify a menu option and a command corresponding to each menu option. The caller can respond to the voice prompts by selecting a number on a phone keypad corresponding to a desired option or verbalizing a command corresponding to the desired option. In response to the selection of an option, the VRS server 105b can provide a set of voice prompts corresponding to the selected option in the response tree or, if the selected option is an extension, the system can connect the caller to the selected extension. The content in the voice response menu (e.g., department name, etc.) can be based on or derived from the account configuration information stored in the database 103b. The telephony server 107b provides telephony services such as answering inbound calls, making outbound calls, bridging calls, playback, call recording, and voicemail, among other things.

The calling device 119 initiates a call by calling a phone number 121 (e.g., "555-1212"). Alternatively, if the call is a VOIP call, rather than calling a phone number, the calling device initiates the call by sending a call request to the intended recipient over packet-based network 113. The VRS gateway 109b receives the called number from the calling device 119 over the telecom network 115 or, if the call is a VOIP call, receives the call request over the packet-based network 113. The VRS gateway 109b determines if a VRS menu is available for the called number. In order to determine whether a VRS menu is available, the VRS gateway 109b looks up the called number or, if the call is a VOIP call, another identifier for the recipient, in a VRS directory 111b that stores information including phone numbers and whether a voice response menu exists for that phone number.

In some example implementations, the hosted PBX 101a and the hosted PBX 101b can share components and functionality, or can be combined into a single hosted PBX. For example, the system for accessing a VPM and the system for accessing a menu provided by a VRS can share common structure and data that are feasible for sharing. Further, the databases 103a and 103b can share and store common account configuration information, such as call answering rules, call routing rules, billing information. Other shared features and data are possible.

A transition server 129 shown in FIG. 1B, for example, can perform actions necessary for transitioning between the VPM and the VRS. For example, in the currently described example implementation, the transition server 129 initiates restoring state information when the caller transitions from one system to another. Additionally, if the caller enters in a call queue, e.g., into a first in first out (FIFO) queue of callers that are waiting to talk to a human operator or to perform some other action, the VPM and the VRS can account for any time that the caller has spent in the queue, regardless of whether the caller transitions between the VPM and the VRS. That is, if a caller enters a queue using one system, e.g., the VRS, and then leaves the queue to attempt to resolve their issue using the other system, e.g., the VPM, the caller can be credited for the time spent using the first system if they choose to re-enter the queue by returning to the other system. The caller may be credited for time spent in the VPM by being placed in the queue at a position appropriate to where the caller would have been positioned had they remained in the queue rather than transitioning to the VPM. Alternatively, the caller may be kept in the queue even after a transition to the other system, and, if the caller has moved to the front of the queue while using a VPM, may be presented with an option indicating that the caller is at the front of the call queue and prompting the caller to either return to the other system in order to be connected to the human operator or to leave the queue. Optionally, when both a VRS and a VPM are available to users, the criteria for determining which callers are moved to the front of the queue may depend on other factors than time spent in the system. For example, the other factors can include number of menus navigated through or number of choices made, i.e., number of menu options selected, so that callers who has navigated through more possibilities, e.g., have tried more automated ways to resolve their issues using the VPM, are more likely to be placed at the front of the call queue.

In some implementations, when caller actions using the VPM or VRS lead to a predetermined termination point, e.g., contacting a person or some other specific result, then a predetermined event occurs. For example, reaching a person can result in starting a videoconference or screen sharing application that can be commenced rather than, or in addition to, a phone call. Further, a user may be able to upload a file using a VPM (e.g., by capturing a photo using a mobile device or uploading a document) then transition to the VRS, with access to the file available for use in either or both systems, e.g., by a human operator that the user is connected to using the VRS.

Example VPM Process

Figure 2:
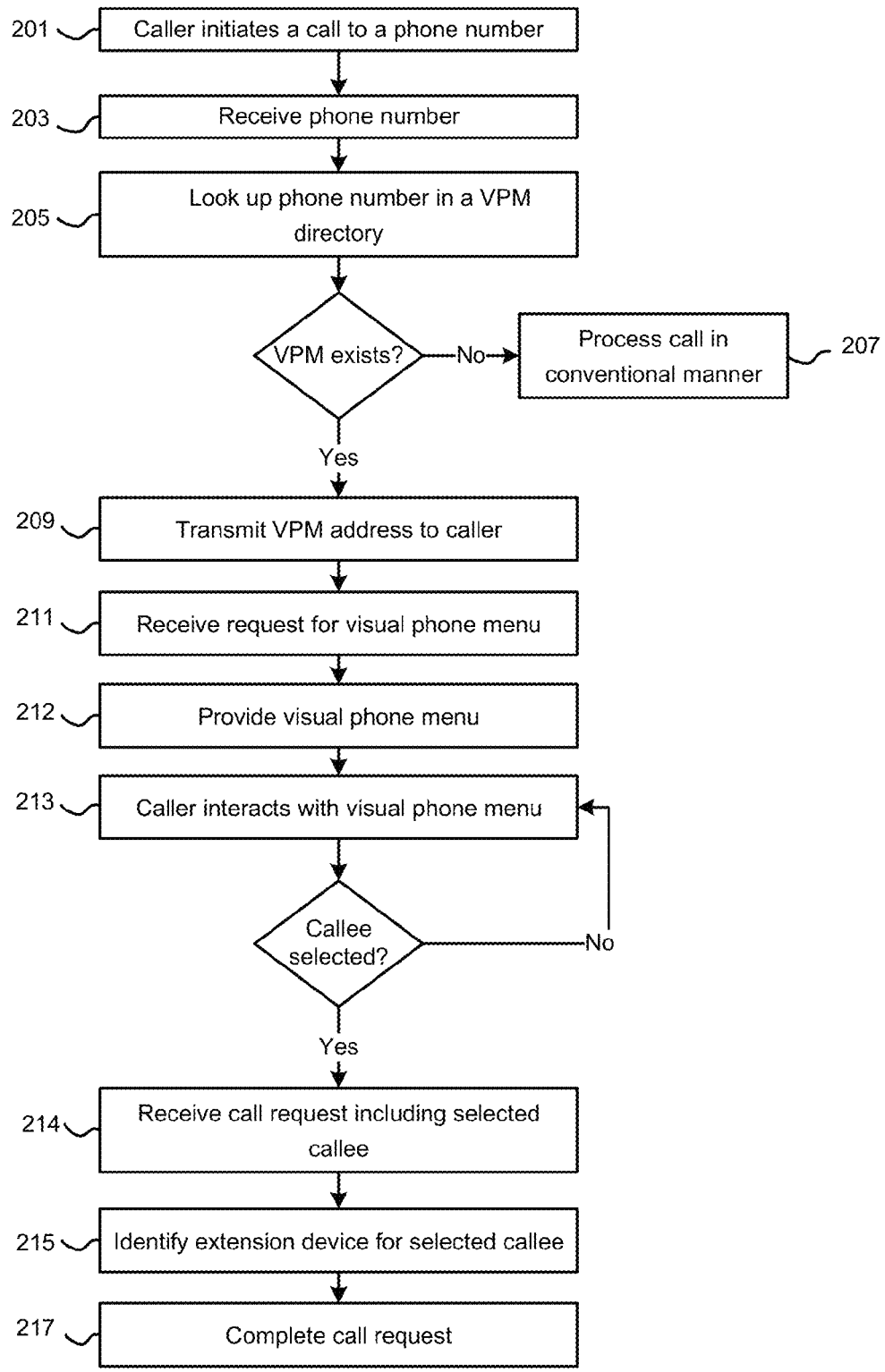
FIG. 2 is a flow chart illustrating an example process for providing access to a visual phone menu.

FIG. 2 is a flow chart illustrating an example process for providing access to a VPM. For the purposes of this example, a subscriber is someone who has an account with the hosted PBX. A caller is someone who is calling the subscriber or the subscriber's company, by calling a primary phone number for the subscriber's account or, if the call is a VOIP call, transmitting a call request to the subscriber. The caller may be a customer of the subscriber or the subscriber's company. A callee is the department, person, or extension that a caller calls.

In step 201, a caller initiates a call to a phone number. For example, a caller can use a calling device 119 to dial or enter a phone number 121 ("555-1212"). The phone number 121 corresponds to a primary phone number for an account on the hosted PBX 101. Alternatively, if the call is a VOIP call, the caller can initiate the call by sending a call request to the intended recipient.

In step 203, the phone number or call request is received. For example, the VPM gateway 109 receives the phone number 121 from the calling device 119.

In step 205, a lookup is performed for the called number or for the intended recipient. For example, the VPM gateway 109 can do a lookup in the VPM directory 111 for the phone number 121. The entry for phone number 121 ("555-1212") is found in the first row in Table 1 (which is an example representation of the information found in the VPM directory 111). A corresponding VPM does exist for this phone number (VPM="yes") and the VPM address is "www.companyA.com/vpm/subscriber".

In step 207, when no VPM is found for the called number, or if the called number is not found (e.g., not located in the VPM directory 111), the call is processed conventionally (e.g., the call is handled by the telephony server 107 and the client device 117 is connected in a conventional manner to a conventional phone menu or other answering telephony device). In some embodiments, and as will be described in more detail below with reference to FIG. 5, when no VPM is found, a VPM can be generated from VRS data.

In step 209, when a VPM corresponding to the called number is found, an address for the VPM is transmitted to the caller. For example, the VPM gateway 109 can transmit the VPM address 122 (e.g., a URL or IP address) to the calling device 119. In some implementations, the VPM gateway 109 sends a short message service (SMS) message back to the calling device 119 with the VPM address contained within the message. In some implementations, the VPM gateway 109 can play back an audio message of the VPM address 122 to the calling device 119 for the caller to listen to. If the calling device is running VPM software, the address for the VPM or a notification that the VPM is available can be displayed as a prompt by the VPM software.

In some implementations, prior to the address for the VPM being transmitted to the calling device, the calling device 119 is presented with an option to be diverted to the VPM or to continue with completing the call in a conventional manner. The option can be presented as an interactive voice response, for example: "Select or say '1' to access a visual phone menu. Select or say '2' to continue and hear a voice response menu." As will be described in more detail below, rather than present the option, a determination can be made to automatically transition the caller to the VPM based on any of a variety of factors.

In step 211, a request is received for the VPM. For example, the VPM server 105 receives a request from the client device 117 at the VPM address 122 provided by the VPM gateway 109. In some examples, the calling device 119 is also an internet-enabled computing device with a display (e.g., a smartphone, softphone, and other VoIP phones), in which case the caller can connect to the VPM address 122 directly from the calling device 119 as well. In this scenario, the calling device 119 and the client device 117 can be one and the same device.

In some implementations, the calling device 119 displays the VPM address 122 in an SMS message as a hyperlink. The caller can select the hyperlink (using, for example, a pointer or a touch interface on the calling device 119), which can automatically open a browser window on the calling device 119 to the VPM address.

In step 212, a VPM is provided to the caller. For example, the VPM server 105 can provide the VPM 123 to the client device 117. In some implementations, the VPM 123 is provided in a markup language. Suitable markup languages include hypertext markup language (HTML), standard generalized markup language (SGML), extensible markup language (XML), and so on.

Figure 3A:
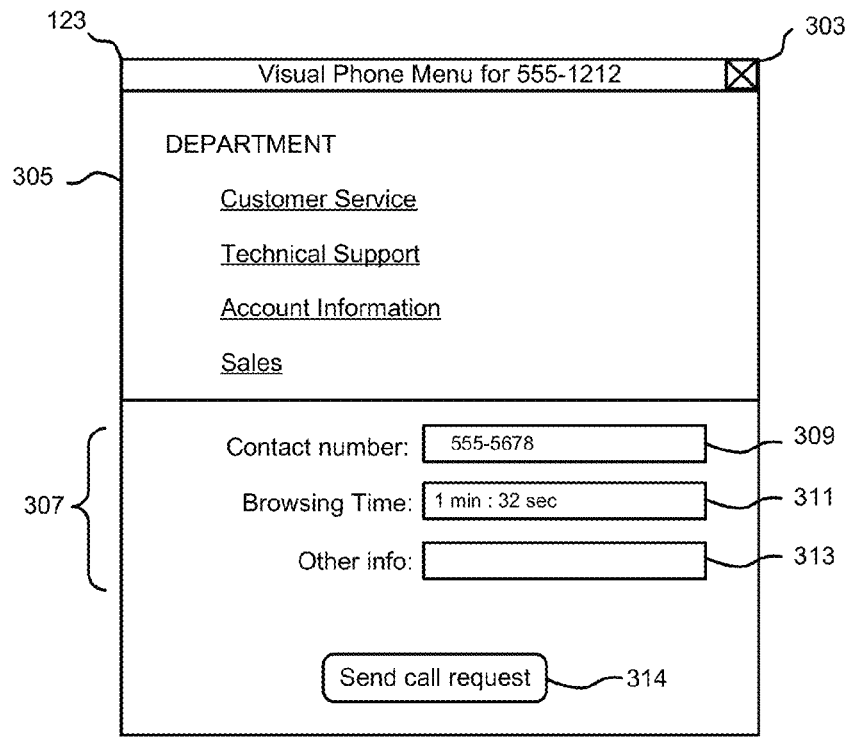
FIGS. 3A-3B show examples of a visual phone menu for a phone number being displayed on a display of a client device.

FIG. 3A shows an example VPM 123 being displayed on a display of the client device 117. The VPM 123 is presented in an application window 303, e.g., a browser window or a window generated by VPM software running on the client device. The VPM 123 includes, for example, a callee section 305, an information section 307, and a send call request button 314. The callee section 305 lists the callees available to call. The callees shown in the VPM 123 are departments, but other kinds of callees (such as names, extensions, functions, titles, etc.) can be listed. The listed callees are selectable by the caller, meaning that they are selectable through a user input interface such as a touchscreen, input keys, pointer, etc. For example, in FIG. 3A the department names are hyperlinked, and selecting a department (e.g., clicking on the department with a pointer) can initiate a call request. Alternative means of selection include providing checkboxes, radio buttons, highlighting, etc.

The information section 307 can include additional information that the caller sends back to the VPM server 105 when initiating a call request. In some implementations, the caller enters a contact number 309 for a calling device where the caller wants to complete the call. Alternatively, other data for contacting the caller can be provided. The caller can enter the number of the calling device 119, or the caller can enter the number of another calling device altogether. In some implementations, a number for the client device is automatically detected and provided as the contact number 309.

Optionally, a timer 311 may be included that tracks the amount of time the caller spends perusing the VPM 123 before making a selection. The VPM server 105 can use the timer 311 information to credit the caller with time spent in a call queue. A field 313 can be used to enter many other kinds of information. For example, field 313 can be used to enter a caller's name, a caller's reason for calling, caller account numbers, etc. A caller could also upload a file in this field. A caller can also indicate a preference as to how the call request should be completed. For example, the caller may wish to be connected immediately to the selected callee. Or, the caller may wish to complete the call at some time in the future, and can enter a later time when the call should be returned.

Once the caller has identified and selected a callee from the VPM, the caller sends a call request to the hosted PBX 101 to connect to the callee. The caller sends a call request to be connected to the selected callee, for example, by selecting "send call request" button 314. There are various other ways for a caller to enter additional information and send a call request. For example, the VPM can provide pop-up windows for entering additional information or for sending a call request.

Figure 3B:
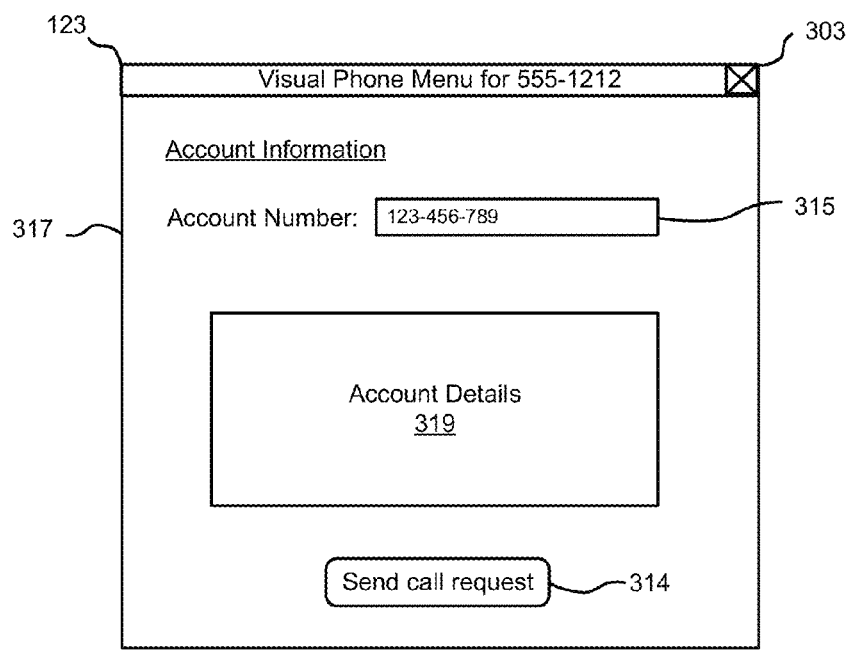

Due to its interactive nature, a VPM can provide and receive more information than would be the case for a conventional phone menu. For example, the VPM can be designed to provide detailed system status information, frequently asked questions, search functionality, etc. The interactive nature of a VPM allows customized information to be provided to a caller as well. For example, FIG. 3B shows an expanded view when the department "Account Information" is selected from FIG. 3A. The account section window 317 has a field 315 for a caller to enter an account number, and a section 319 for account details displaying customized information based on the caller's entered account number, such as account balances, account preferences, history of transactions, etc. The caller can also connect to this department by clicking on send call request button 314. The information provided by the caller can be stored for reference and to maintain a caller history, so that future visits or calls by the same caller can be addressed more efficiently.

Referring back to the flowchart in FIG. 2, in step 213, the caller interacts with the VPM. For example, such interaction includes viewing the information provided in the VPM, entering information into the VPM, etc. The caller continues to interact with the VPM, e.g., to navigate through different levels of a response tree, until the caller selects a callee and sends a call request.

In step 214, a call request is received which includes the selected callee. For example, the hosted PBX 101 receives a call request 125. The call request can include a number for the calling device 119 and the selected callee from the VPM (e.g., VPM 123).

In step 215, the extension for the selected callee is identified. The hosted PBX 101 can identify the extension for the caller's selected callee and the associated extension device 127 to be contacted. The extensions and their associations can be configured by the subscriber. For example, the subscriber may configure an extension to be directed to any one of a number of devices, such as a mobile phone, a landline phone, a VoIP phone, a computer softphone, etc.

In step 217, the call request is completed. For example, the VPM server 105 and/or the database 103 can provide the telephony server 107 with the phone numbers for both the calling device 119 and the extension device 127. The telephony server 107 can connect the calling device 119 and the extension device 127 in a call.

The call request can be completed in different ways, depending on how the hosted PBX 101 is set up to handle call requests, or on preferences submitted by the caller in the call request. The call request can be treated as an initiation of a call placed by the calling device 119. The call is completed by connecting calling device 119 to the extension device 127 directly upon receipt of the call request by the telephony server 107.

The call request can also be treated as a "callback". In a callback, the telephony server 107 calls the calling device 119 and connects it to the extension device 127 in a call. Generally, the calling device 119 will ring (or otherwise alert the caller that a call has arrived) and the caller will need to answer the call to be connected to the extension device 127. From the viewpoint of the caller in this scenario, it appears as if the extension device 127 has called the caller back. In some implementations, this callback happens after some time has passed since the call request was received. For example, completion of the call request may be delayed because it is put into a queue to be completed later when the call request has moved to the front of the queue, or because the caller has requested completion to happen at a future time, or because completion is just delayed.

Initiating a VPM and Transitions to/from a VRS

Figure 4A:
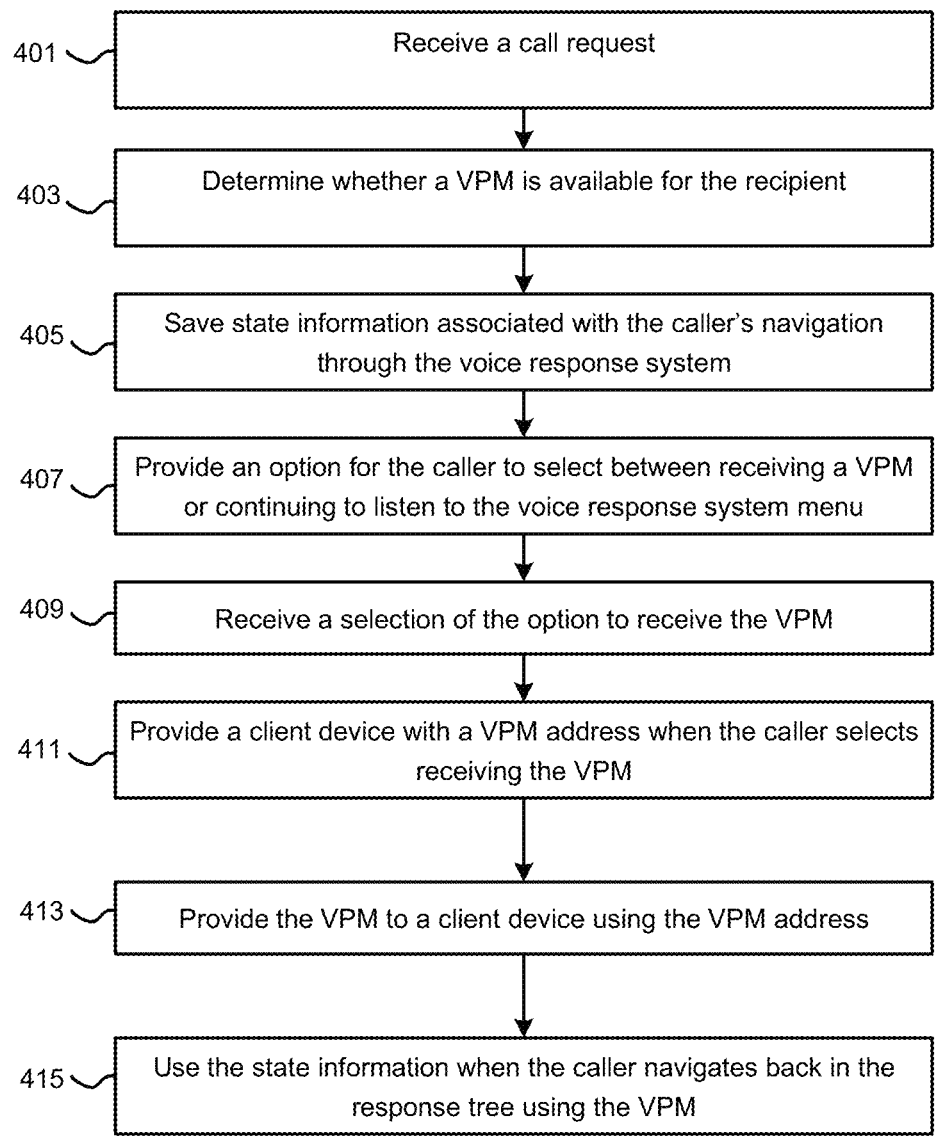
FIG. 4A is a flow chart illustrating an example process for initiating a visual phone menu from a voice response system.

FIG. 4A is a flow chart illustrating an example process for initiating a VPM from a VRS. The process can be performed using a combination of the system for accessing the VPM and the system for accessing the VRS, as described above with reference to FIGS. 1A and 1B, respectively.

In step 401, a call request is received that is transmitted from a calling device to initiate a call to a recipient. The call request can identify the recipient by a phone number or, if the call is a VOIP call, by another identifier. The recipient is associated with a VRS that includes a response tree that can be navigated by a caller listening and responding to various voice prompts.

In step 403, a determination is made whether a VPM is available for the recipient. For example, the VPM gateway 109 looks up the called number in the VPM directory 111.

In some implementations, determining whether a VPM is available can include looking up the phone number in a VPM directory that stores phone numbers and any associated VPM addresses. For example, the VPM directory 111 stores information including phone numbers, whether a VPM exists for that phone number, and the address of the VPM (e.g., a uniform resource locator, "URL"), if one exists, as shown in Table 1.

In step 405, state information associated with the caller's navigation through the VRS is saved. For example, on an ongoing basis, the VRS server 105*a* or some other component(s) of the hosted PBX 101*a*, can store state information for the caller in the database 103*a*. The state information can include, for example, information about the caller's path through the phone tree and previous navigation. The information can include time elements, e.g., that indicate how long the caller waited (and/or is currently waiting) on hold. Other state information is possible. In some implementations, saving the state information is be performed by the transition server 129. Additionally, the state information, including the caller's navigation history, can be provided to an agent, i.e., a human operator, once the caller has been connected to the agent in order to allow the agent to better assist the caller.

In step 407, an option is provided for the caller to select between receiving a VPM or continuing to listen to the VRS menu. For example, the VRS 123*a* can present the caller who is using the calling device 119 with an audio message that indicates the existence of the VPM and instructions (e.g., a voice prompt) for how to transition to the VPM.

In some implementations, providing an option can include providing the user a voice prompt of the availability of the VPM. For example, the caller can be presented with a prompt indicating different ways of transition, e.g., "Say 'Yes' or press '1' to use the Visual Phone Menu".

In some implementations, rather than providing an option, the system can store a preference associated with a caller that initiated the call and, based on the stored preference, select between the VPM and the VRS. For example, the caller can have a preference that has been specified, by the caller, at an earlier time. One such preference can specify to automatically switch to the VPM when, for example, the calling device 119 is a smartphone or some other device capable of presenting the VPM to the caller. In some implementations, caller preferences can be stored in the database 103*a*.

In some implementations, rather than provide an option, the system can determine a selection based on a depth or complexity of the response tree, capabilities of the client device, or both. For example, the VRS 123*a* can determine a need or a desire of the caller to have presented the VPM. In some implementations, determining a caller's intended use (or need) of either the VPM or the VRS (e.g., switching between visual and voice) can depend upon the state of the phone (e.g., the caller taking the phone away from the ear, or placing it there). For example, it can be determined that the caller would prefer a voice mode over a visual mode when the screen of the phone cannot be viewed, based on data received from the phone that identifies its position (e.g., next to the ear). The system may determine that the depth or complexity of the response tree is sufficient to switch the call to the VPM if the response tree requires a complex alphanumeric input, e.g., a make and model number of a part that needs repair, that includes more than a threshold number of characters to allow for easier data input by the caller. As another example, the system may determine that the depth or complexity of the response tree is sufficient to switch the call to the VPM if more than a threshold number of menu options are presented to the caller at a particular node in the VRS. As yet another example, the system may determine the amount of time needed to listen to each menu option at a given level of the response tree, i.e., the total amount of time needed to listen to all of the voice prompts provided by the VRS at that level, the amount of time needed to listen to each menu option at one or more subsequent levels of the VRS, or both. The system can then determine that the depth or complexity of the tree is sufficient to switch the call to the VPM when the amount of time exceeds a threshold value.

In step 409, a selection of the option to receive the VPM is received. For example, the caller can provide a voice command or other input that signals that the caller wishes to receive the VPM. The voice command, for example, can include the user saying "Yes" or some other affirmative command in response to a voice prompt, e.g., "would you like to switch to the Visual Phone Menu now?" As described above, in some implementations, the system may automatically determine to provide the VPM to the user rather than receiving a selection of an option to receive the VPM.

In step 411, a client device is provided with a VPM address when the caller selects receiving the VPM. For example, the VRS client at the calling device 119 can receive the VPM address from the hosted PBX or other provider for the VRS directory. Optionally, the system can customized the provided VPM based on state information for previous calls placed by the caller or other callers. That is, if the caller frequently selects particular menu options when using the VPM during previous calls, those menu options can be provided as part of the VPM even if they do not correspond to the caller's current position in the response tree. Alternatively or in addition, if other callers frequently select certain menu options, those options can be provided as part of the VPM.

In some implementations, the process can include providing both the VPM and voice prompts. For example, the VRS client can provide, to the caller, the VPM 123 and include voice prompts from the VRS that associated with the corresponding node in the response tree. That is, the system can provide visual menu options in a VPM and also provide voice prompts that are associated with the menu options. Thus, a call may be able to visualize the menu options while continuing to hear the same voice prompts that would be provided by the VRS.

In some implementations, the VPM address can be a uniform resource locator (URL) or an internet protocol (IP) address that belongs to a VPM server. For example, the VPM address can be a uniform resource locator (URL) or an internet protocol (IP) address for the VPM server 105. The VPM address can also point to an address external to the hosted PBX 101.

In some implementations, providing the calling device with a VPM address can include sending the calling device a short message service (SMS) message with instructions for accessing the VPM. For example, VPM gateway 109 sends a short message service (SMS) message back to the calling device 119 with the VPM address contained within the message.

In some implementations, the client device can be the same as the calling device. For example, the calling device 119 can be an internet-enabled computing device with a display (e.g., a smartphone, softphone, or other VoIP phone), in which case the caller can connect to the VPM address 122 directly from the calling device 119 as well. In this scenario, the calling device 119 and the client device 117 can be one and the same device. In some cases, if the calling device is running VPM software, rather than provide the VPM address to the client, the VPM software can automatically navigate to the VPM address and launch the VPM, e.g., in an application window of the VPM software or in an Internet browser.

In step 413, the VPM is provided to a client device using the VPM address. The system provides the VPM based on the state information associated with the caller's navigation through the VRS prior to the selection. That is, the system provides, in the VPM, information corresponding to the position in the response tree that corresponds to the appropriate position in the caller's navigation through the tree using the VRS. For example, if a user has navigated to selecting between a point in the response tree that allows the user to select between different extensions within a particular department, the system can provide, in the VPM, information allowing the user to select between the extensions rather than make the user re-start the navigation process. For example, the VPM server 105 can provide the VPM 123 to the client device 117. In some implementations, the VPM 123 is provided in a markup language. Suitable markup languages include hypertext markup language (HTML), standard generalized markup language (SGML), extensible markup language (XML), etc. State information stored in the database 103a is also provided. In some implementations, providing the state information can be performed by the transition server 129.

In some implementations, the VPM can be provided in a markup language adapted for desktop voice over internet protocol (VoIP) phones. For example, the VPM 123 can be provided in a format that can be interpreted by a desktop VoIP phone. Further, a markup language can be developed for the VPM to provide a standard interface accessible by desktop VoIP phone menus.

In step 415, the state information is used when the caller navigates back in the response tree using the VPM. For example, state information that was saved by the VRS server 105a in the database 103a can be used to reinstate the same state in the VPM 123. The state information can include, for example, information about the caller's path through the phone tree and previous navigation. The information can include current selection(s) and time elements that indicate how long the caller waited (and/or is currently waiting) on hold. Other state information is possible. In some implementations, handling the state information can be performed by the transition server 129.

In some implementations, the process can further include saving state information associated with a user's navigation through the VPM, providing an option for a caller to select to return to listening to voice prompts provided by the VRS, receiving a selection of the option to return to the VRS, and providing the state information associated with the user's navigation through the VPM to the VRS so as to enable navigation there afterwards in the response tree. For example, the VPM server 105 (or some other component(s) of the hosted PBX 101) can store state information for the caller in the database 103. The state information can include, for example, information about the caller's path through the phone tree and previous navigation. The information can include time elements, e.g., that indicate how long the caller waited (and/or is currently waiting) on hold. Once the state information is stored, the VPM 123 can present the caller who is using the calling device 119 with an option for transitioning back to the VRS 123a. If the caller exercises the option, for example, the VRS server 105a can copy (or use) the state information stored in the database 103 to restore the state information stored in the database 103a. Once the database 103a is updated in this way, navigation in the VRS 123a can resume.

In some implementations, the process can further include receiving selections from the client device of menu items in the VPM and traversing the response tree based on the received selections. For example, caller inputs provided in the VPM 123, including the caller's menu selections made on the calling device 119, can be used in traversing the response tree, including after a transition back to the VRS 123*a*.

Figure 4B:
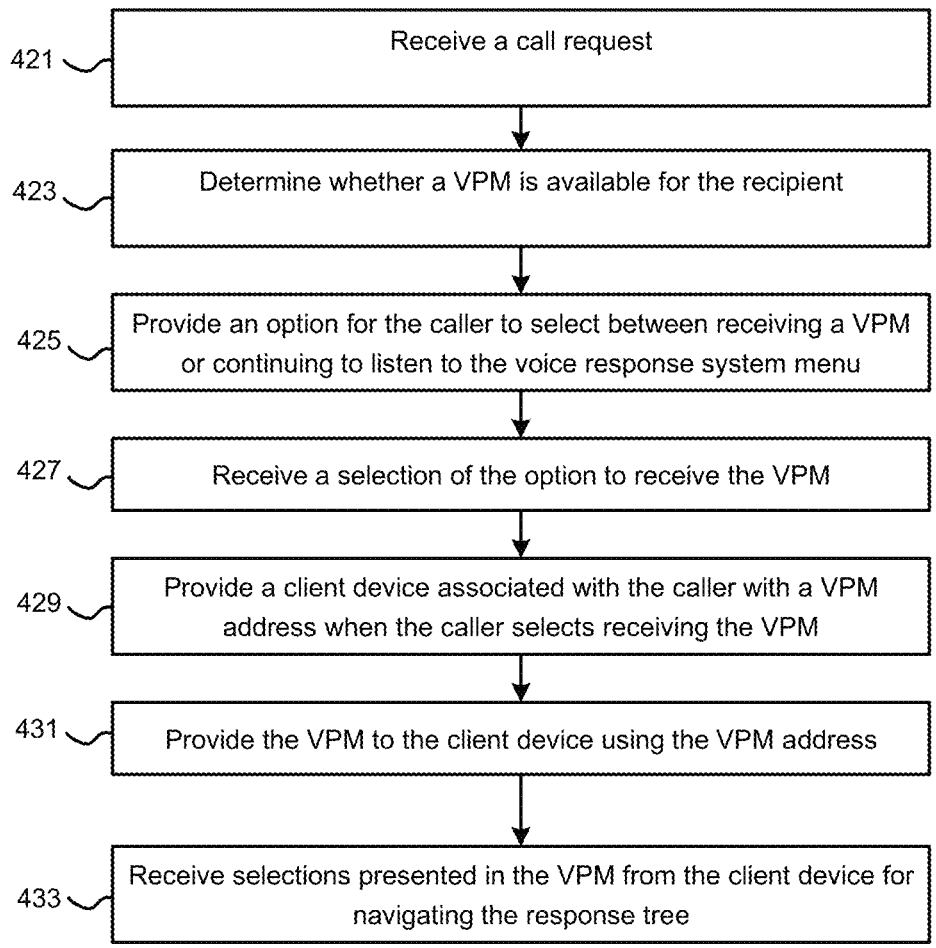
FIG. 4B is a flow chart illustrating an example process for switching back and forth between a visual phone menu and a voice response system.

FIG. 4B is a flow chart illustrating an example process for switching back and forth between a VPM and a VRS. The process can be performed using a combination of the system for accessing the VPM and the system for accessing the VRS, as described above with reference to FIGS. 1A and 1B, respectively.

In step 421, a call request is received that is transmitted from a calling device to initiate a call to a recipient. The call request can identify the recipient by a phone number or, if the call is a VOIP call, by another identifier. The identifier is associated with a VRS that includes a response tree that can be navigated by a caller listening and responding to various voice prompts.

In step 423, a determination is made whether a VPM is available for the phone number. For example, the VPM gateway 109 looks up the called number in the VPM directory 111.

In step 425, an option is provided for the caller to select between receiving a VPM or continuing to listen to the VRS menu. For example, the VRS 123*a* can present the caller who is using the calling device 119 with an audible message that indicates the existence of the VPM and instructions (e.g., a voice prompt) for how to transition to the VPM.

In step 427, a selection of the option to receive the VPM is received. For example, the caller can provide a voice command or other input that signals that the caller wishes to receive the VPM. The voice command, for example, can include the user saying "Yes" or some other affirmative command in response to a voice prompt, e.g., "would you like to switch to the Visual Phone Menu now?"

In step 429, a client device associated with the caller is provided with a VPM address when the caller selects receiving the VPM. For example, the VRS client at the calling device 119 can receive the VPM address from the hosted PBX or other provider for the VRS directory.

In step 431, the VPM is provided to the client device using the VPM address. For example, the VPM server 105 can provide the VPM 123 to the client device 117. This can occur, for example, using the URL or an internet protocol (IP) address that belongs to a VPM server. The VPM can provide the option to return to the VRS, e.g., to return to navigating the response tree using by responding to voice prompts generated by the VRS.

In step 433, selections presented in the VPM are received from the client device for navigating the response tree including a selection to enable the caller to return to the VRS. As an example, based on the caller's selections made in the VPM 123, the calling device 119 can navigate to corresponding parts of the response tree and then transitioning the caller to the VRS 123*a* at the point in the response tree where the selection to return to the VRS was made, e.g., using state information identifying the caller's navigation through the tree using the VPM.

Figure 4C:
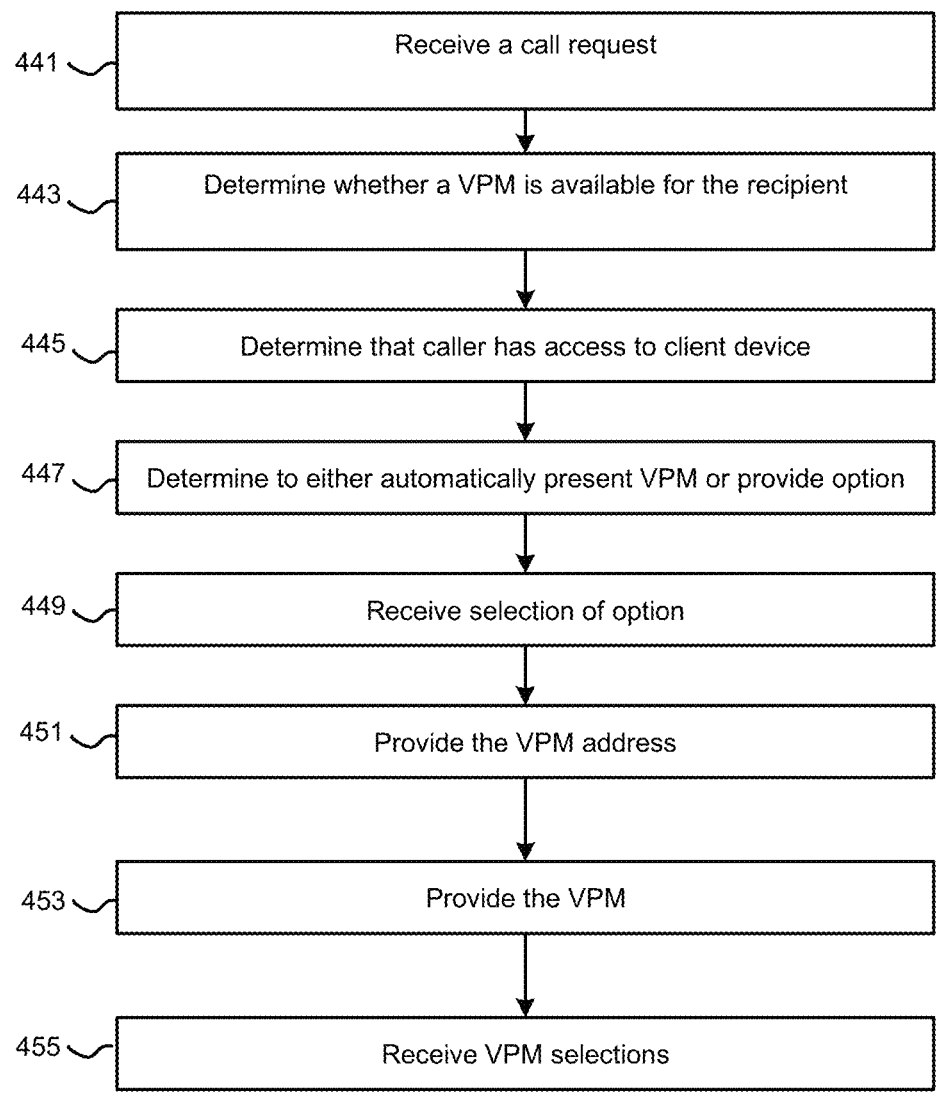
FIG. 4C is a flow chart illustrating an example process for providing transitions using a visual phone menu.

FIG. 4C is a flow chart illustrating an example process for providing transitions using a VPM. The process can be performed using a combination of the system for accessing the VPM and the system for accessing the VRS, as described above with reference to FIGS. 1A and 1B, respectively.

In step 441, a call request is received that is transmitted from a calling device to initiate a call to a recipient. The call request can identify the recipient by a phone number or, if the call is a VOIP call, by another identifier. The identifier is associated with a VRS that includes a response tree that can be navigated by a user listening and responding to various voice prompts.

In step 443, a determination is made whether a VPM is available for the phone number. For example, the VPM gateway 109 looks up the called number in the VPM directory 111.

In step 445, a determination is made that a caller associated with the call has access to a client device while conducting the call that is configured for receiving and presenting visual information to the user. For example, the VRS server 105*a* can determine that the caller associated with the call request 125 is using calling device 119 and that the calling device 119 is an internet-enabled computing device with a display (e.g., a smartphone, softphone, or other VoIP phone). This can indicate, for example, that the caller can connect to the VPM address 122 directly from the calling device 119.

In step 447, a determination is made either to automatically present the VPM on the client device or present an option for presentation of the VPM on the client device based on one or more of a complexity of the response tree, number of available options at a given node of the response tree, a preference of the caller, or after reaching an end of a set of options for a given node in the response tree. For example, the VPM server 105 can determine whether the VPM is to be presented automatically to the caller, or whether the caller will be presented with an option to start the VPM. The determining can be based on various signals, e.g., a complexity of the response tree, a number of available options (e.g., sub-departments, phone numbers, etc.) at a given node of the response tree, a preference of the caller (e.g., to always provide the VPM, or to provide the VPM under certain conditions), reaching an end of a set of options for a given node in the response tree, a geographical location of caller, device language capabilities (e.g., a smart phone is not available and/or the caller may not understand spoken English), and account type (e.g., premium users are to receive VPM).

In step 449, a selection of the option to receive the VPM is received. For example, the caller can provide a voice command or other input that signals that the caller wishes to receive the VPM. The voice command, for example, can include the user saying "Yes" or some other affirmative command in response to a voice prompt, e.g., "would you like to switch to the Visual Phone Menu now?"

In step 451, the client device is provided with a VPM address based on receiving the selection. For example, the VRS client at the calling device 119 can receive the VPM address from the hosted PBX or other provider for the VRS directory.

In step 453, the VPM is provided to the client device using the VPM address. For example, the VPM server 105 can provide the VPM 123 to the client device 117. This can occur, for example, using the URL or an internet protocol (IP) address that belongs to a VPM server. In some implementations, e.g., if the client device is running VPM software, the VPM software can obtain the VPM address and access the VPM at the VPM address automatically rather than present the option for presentation of the VPM.

In step 455, selections presented in the VPM are received from the client device for navigating the response tree. As an example, based on the caller's selections made in the VPM 123, the calling device 119 can navigate to corresponding parts of the response tree. Optionally, the options presented to the user at one or more levels of the response tree can include the option to return to the VRS to continue navigating the response tree.

Generating a VPM from VRS Data

Figure 5:
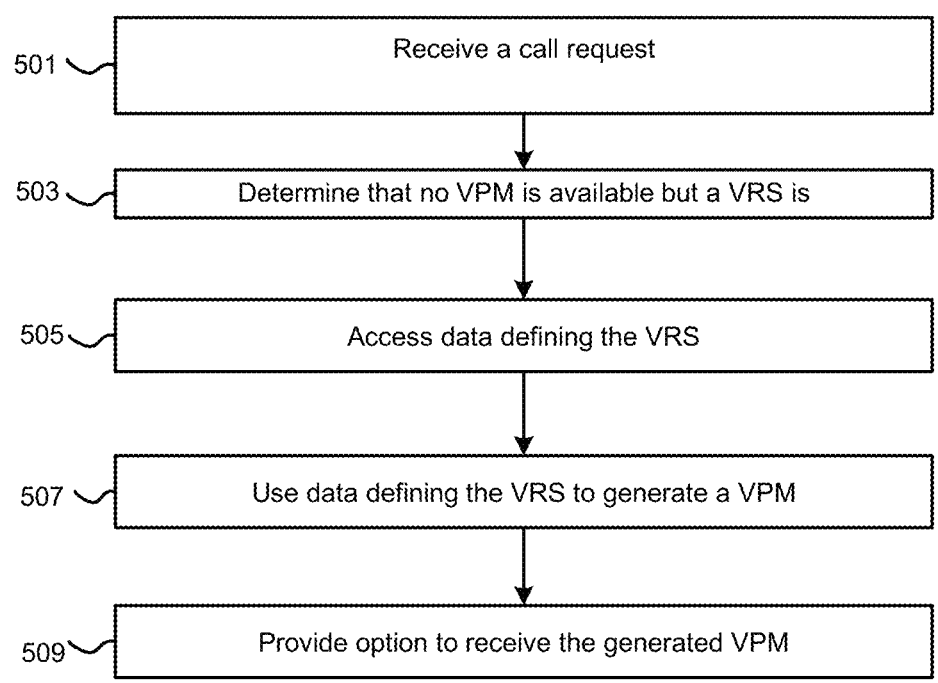
FIG. 5 is a flow chart illustrating an example process for generating a visual phone menu from data for a voice response system.

FIG. 5 is a flow chart illustrating an example process for generating a VPM from data for a VRS. The process can be performed using a combination of the system for accessing the VPM and the system for accessing the VRS, as described above with reference to FIGS. 1A and 1B, respectively.

In step 501, a call request is received that is transmitted from a calling device to initiate a call to a recipient. The call request can identify the recipient by a phone number or, if the call is a VOIP call, by another identifier.

In step 503, it is determined that no VPM is available for the recipient but that a VRS is available.

In step 505, data defining the VRS is accessed. In particular, the data defining the VRS defines the structure of the phone menu, i.e., the structure of the response tree to be navigated using the VRS, and, for each option in each menu includes a reference to an audio file corresponding to the menu option. In some embodiments, the data also includes a text transcript of the audio for each option. For example, the data may be in a definition file for the VRS defined in an Extensible Markup Language (XML) schema obtained from a VRS directory, e.g., the VRS directory 111b of FIG. 1B.

In step 507, the data defining the VRS is used to generate a VPM. That is, a VPM having the same structure as the VRS is generated. If transcripts of the audio for each option are available, those transcripts are used to generate the visual menu options at each level of the response tree. If transcripts are not available, the audio for each menu option is transcribed, e.g., using a conventional speech transcription technique, and the visual menu options are generated from the transcribed audio. Once generated, the VPM can be assigned to a VPM address.

In step 509, an option to receive the generated VPM is provided to the caller, e.g., as described above. Additionally, as described above, in some embodiments, the generated VPM is automatically provided to the caller instead of providing the option to receive the VPM.

In some embodiments, callers are provided the option of saving the state information for a particular call that identifies a particular destination in a response tree locally on the calling device, e.g., in a call log or in a contacts list of the calling device. When the caller uses the information to place another call, the system can route the call to the particular destination.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this disclosure contains many specific implementation details, these should not be construed as limitations on the scope of what may be claimed, but rather as descriptions of features specific to particular example embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for accessing a response tree in a voice response system, comprising:

receiving a call from a calling device to the voice response system;

tracking state information corresponding to accessing the response tree by voice prompts, wherein the state information includes information about a path navigated through the response tree by the voice prompts;

switching the call from accessing the response tree using voice prompts to accessing the response tree using a visual phone menu (VPM) using the state information; and using the information about the path navigated through the response tree by the voice prompts to facilitate backwards navigation in the response tree using the VPM.

2. The method of claim 1, wherein switching the call from accessing the response tree using voice prompts to accessing the response tree using the VPM comprises:

providing an option for a caller to select between receiving the VPM or continuing to access the response tree by voice prompts;

receiving a selection of the option to receive the VPM; and switching the caller to accessing the response tree using the VPM in response to receiving the selection.

3. The method of claim 2, wherein providing the option includes providing the caller a voice prompt indicating that the VPM is available.

4. The method of claim 1, wherein switching the call from accessing the response tree using voice prompts to accessing the response tree using the VPM comprises:
providing the VPM to a client device.

5. The method of claim 4, wherein the client device is the same as the calling device.

6. The method of claim 4, further comprising:
receiving selections from the client device of menu items in the VPM and traversing the response tree based on the received selections.

7. The method of claim 1, wherein switching the call from accessing the response tree using voice prompts to accessing the response tree using the VPM comprises:
determining to switch the call based on a depth or complexity of the response tree.

8. The method of claim 2, further comprising:
tracking state information associated with navigation of the response tree using the VPM;
providing an option for a caller to select to return to accessing the response tree using voice prompts;
receiving a selection of the option to return to accessing the response tree using voice prompts; and
using the state information associated with the navigation of the response tree using the VPM when the caller accesses the response tree using voice prompts.

9. The method of claim 1, further comprising:
prior to switching the call, determining whether a VPM is available for the response tree.

10. The method of claim 9, further comprising:
determining that a VPM is not available for the response tree;
obtaining data defining a structure of the response tree; and
generating, from the data defining the structure of the response tree, a VPM for the response tree.

11. A system comprising one or more computers and one or more storage devices storing instructions that when executed by the one or more computers cause the one or more computers to perform operations for accessing a response tree in a voice response system, the operations comprising:
receiving a call from a calling device to the voice response system;
tracking state information corresponding to accessing the response tree by voice prompts, wherein the state information includes information about a path navigated through the response tree by the voice prompts; and
switching the call, from accessing the response tree using voice prompts to accessing the response tree, using a visual phone menu (VPM) using the state information; and
using the information about the path navigated through the response tree by the voice prompts to facilitate backwards navigation in the response tree using the VPM.

12. The system of claim 11, wherein switching the call from accessing the response tree using voice prompts to accessing the response tree using the VPM comprises:
providing an option for a caller to select between receiving the VPM or continuing to access the response tree by voice prompts;
receiving a selection of the option to receive the VPM; and
switching the caller to accessing the response tree using the VPM in response to receiving the selection.

13. The system of claim 11, wherein switching the call from accessing the response tree using voice prompts to accessing the response tree using the VPM comprises:
providing the VPM to a client device.

14. The system of claim 13, the operations further comprising:
receiving selections from the client device of menu items in the VPM and traversing the response tree based on the received selections.

15. The system of claim 11, wherein switching the call from accessing the response tree using voice prompts to accessing the response tree using the VPM comprises:
determining to switch the call based on a depth or complexity of the response tree.

16. The system of claim 11, the operations further comprising:
tracking state information associated with navigation of the response tree using the VPM;
providing an option for a caller to select to return to accessing the response tree using voice prompts;
receiving a selection of the option to return to accessing the response tree using voice prompts; and
using the state information associated with the navigation of the response tree using the VPM when the caller accesses the response tree using voice prompts.

17. The system of claim 11, the operations further comprising:
prior to switching the call, determining whether a VPM is available for the response tree.

18. The system of claim 17, the operations further comprising:
determining that a VPM is not available for the response tree;
obtaining data defining a structure of the response tree; and
generating, from the data defining the structure of the response tree, a VPM for the response tree.

19. A non-transitory computer storage medium encoded with a computer program, the computer program comprising instructions that when executed by one or more computers cause the one or more computers to perform operations for accessing a response tree in a voice response system, the operations comprising:
receiving a call from a calling device to the voice response system;
tracking state information corresponding to accessing the response tree by voice prompts, wherein the state information includes information about a path navigated through the response tree by the voice prompts; and
switching the call, from accessing the response tree using voice prompts to accessing the response tree using a visual phone menu (VPM), using the state information; and
using the information about the path navigated through the response tree by the voice prompts to facilitate backwards navigation in the response tree using the VPM.

* * * * *

UNITED STATES PATENT AND TRADEMARK OFFICE
CERTIFICATE OF CORRECTION

| | |
|---|---|
| PATENT NO. | : 9,628,621 B2 |
| APPLICATION NO. | : 14/614128 |
| DATED | : April 18, 2017 |
| INVENTOR(S) | : Christopher van Rensburg, Dieter W. Rencken and Naveen Sanjeeva |

It is certified that error appears in the above-identified patent and that said Letters Patent is hereby corrected as shown below:

In the Claims

Column 21, Line 17, in Claim 8: delete "claim 2," and insert --claim 1,--, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*